(12) United States Patent
Davis

(10) Patent No.: US 8,705,762 B2
(45) Date of Patent: Apr. 22, 2014

(54) TRUNK MOUNTED AUTOMOTIVE NETWORK SERVER WITH WIRELESS DATA CAPABILITY

(75) Inventor: Gerald Davis, Fayetteville, GA (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 461 days.

(21) Appl. No.: 12/844,926

(22) Filed: Jul. 28, 2010

(65) Prior Publication Data

US 2012/0027221 A1 Feb. 2, 2012

(51) Int. Cl.
*H04B 1/00* (2006.01)

(52) U.S. Cl.
USPC ............... 381/86; 381/84; 381/302; 361/796; 379/569.2

(58) Field of Classification Search
USPC ......... 381/102, 103, 105, 106, 107, 109, 110, 381/302, 71.4, 86, 365, 389, 28, 59, 311, 1, 381/2, 6, 14, 15, 16, 22, 310, 61, 77, 78, 80, 381/82, 84, 332, 104, 119, 120, 337; 700/94; 455/403, 569.2, 575.9, 96, 99, 455/152.1, 238.1, 297, 345; 361/796, 802, 361/786, 695; 379/569.2, 575.9, 96, 99, 379/152.1, 297, 345

See application file for complete search history.

(56) References Cited

U.S. PATENT DOCUMENTS

| | | | |
|---|---|---|---|
| 7,209,490 B2 * | 4/2007 | Isaac et al. ..................... | 370/457 |
| 2002/0164973 A1 * | 11/2002 | Janik et al. ..................... | 455/403 |
| 2005/0105509 A1 | 5/2005 | Crocker et al. | |
| 2006/0100726 A1 * | 5/2006 | Kim et al. ........................ | 700/94 |
| 2007/0067415 A1 | 3/2007 | Kawaguchi | |
| 2009/0058679 A1 | 3/2009 | Lauterbach et al. | |
| 2009/0265060 A1 | 10/2009 | Shibasaki | |

OTHER PUBLICATIONS ("TCP/IP Stack for DSP Cuts Cost of Internet Connectivity", electronic design, by Lou Frenzel, on Jul. 9, 2001.*

* cited by examiner

*Primary Examiner* — Leshui Zhang
(74) *Attorney, Agent, or Firm* — Laurence S. Roach

(57) ABSTRACT

An automotive server arrangement includes an infotainment head unit disposed in a passenger compartment of a vehicle. An antenna is associated with the vehicle. At least one audio speaker is associated with the passenger compartment of the vehicle. A network server is disposed in-between the head unit and the antenna. The network server includes a processor and an amplifier disposed within a common housing. The amplifier drives at least one audio speaker. The processor is connected to the head unit and to the antenna.

20 Claims, 5 Drawing Sheets

TRUNK MOUNTED AUTOMOTIVE NETWORK SERVER WITH WIRELESS DATA CAPABILITY

FIELD OF THE INVENTION

The present invention generally relates to automotive infotainment systems. In particular, the present invention relates to automotive infotainment systems with internet connectivity.

BACKGROUND OF THE INVENTION

State of the art automotive infotainment systems require wireless internet capability to provide advanced features and applications to the end user. Some automotive systems provide these internet-based services through the end user's cell phone via Bluetooth. Other systems use an embedded modem connected to the head unit, or a separate wireless connectivity module. In the future, all automotive system designs will include wireless internet connectivity.

SUMMARY OF THE INVENTION

In one embodiment, the present invention provides a trunk-mounted amplifier with wireless capability, thereby enabling an automotive infotainment system to have internet connectivity. The microprocessor and/or digital signal processor (DSP) in the remote amplifier may run (transmission control protocol/internet protocol) TCP/IP stack, as required for internet connectivity, as well as perform audio processing. A high speed bi-directional network may be provided between the remote amplifier and the infotainment head unit in the passenger compartment. The high speed bi-directional network may enable data to be sent to, and received from, the internet. The head unit may provide the human machine interface that may be used for user input.

The remote amplifier microprocessor or DSP may provide the processing power for the wireless communication receiver (e.g., Worldwide Interoperability for Microwave Access (WiMax), Long Term Evolution (LTE), WiFi, High-Speed Downlink Packet Access (HSDPA), etc.). The remote amplifier may also provide power to the wireless receiver.

The invention comprises, in one particular embodiment, an automotive server arrangement including an audio head unit disposed in a passenger compartment of a vehicle. An antenna is associated with the vehicle. At least one audio speaker is associated with the passenger compartment of the vehicle. A network server is disposed in-between the head unit and the antenna. The network server includes a processor and an amplifier disposed within a common housing. The amplifier drives at least one audio speaker. The processor is connected to the head unit and to the antenna.

The invention comprises, in another particular embodiment, an automotive server arrangement including an infotainment head unit disposed in a passenger compartment of a vehicle. An antenna is attached to a body of the vehicle and wirelessly transmits and receives signals in an internet-compatible format. At least one audio speaker is associated with the passenger compartment of the vehicle. A network server is disposed in a trunk of the vehicle and includes a processor and an amplifier disposed within a common housing. The amplifier drives at least one audio speaker. The processor is connected to the head unit via a high speed automotive network. The processor is connected to the antenna and runs TCP/IP stacks for communicating via the interne. The processor has an operational speed of over 400 million instructions per second.

The invention comprises, in yet another particular embodiment, a method of providing infotainment within a vehicle. An infotainment head unit is provided within a passenger compartment of the vehicle. An antenna is attached to a body of the vehicle. The antenna is used to wirelessly transmit and receive signals in an internet-compatible format. At least one audio speaker is associated with the passenger compartment of the vehicle. A network server is provided including a processor and an amplifier disposed within a common housing. The network server is installed in a trunk of the vehicle. The amplifier of the network server is used to drive at least one audio speaker. The processor of the network server is connected to the head unit via a high speed automotive network. The processor of the network server is connected to the antenna. The processor is used to run TCP/IP stacks for communicating via the internet. The processor operates at a speed of over 400 million instructions per second.

An advantage of the present invention is that it may provide a proximate connection to wireless antennas and receivers at a more convenient location and with better performance.

Another advantage of the invention is that it may accommodate a greater number of audio channels (e.g., up to twelve or even more). By providing an external audio amplifier, excessive heat near the head end unit may be avoided. Such excessive heat may otherwise result from a high number of audio channels. The heat of the amplifier may instead be disposed at a remote location where the heat may be less harmful.

Yet another advantage is that a remote network server allows more room in the front dashboard for larger displays, removes sources of heat, and simplifies the automotive system wiring.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENTS

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Figure 1:
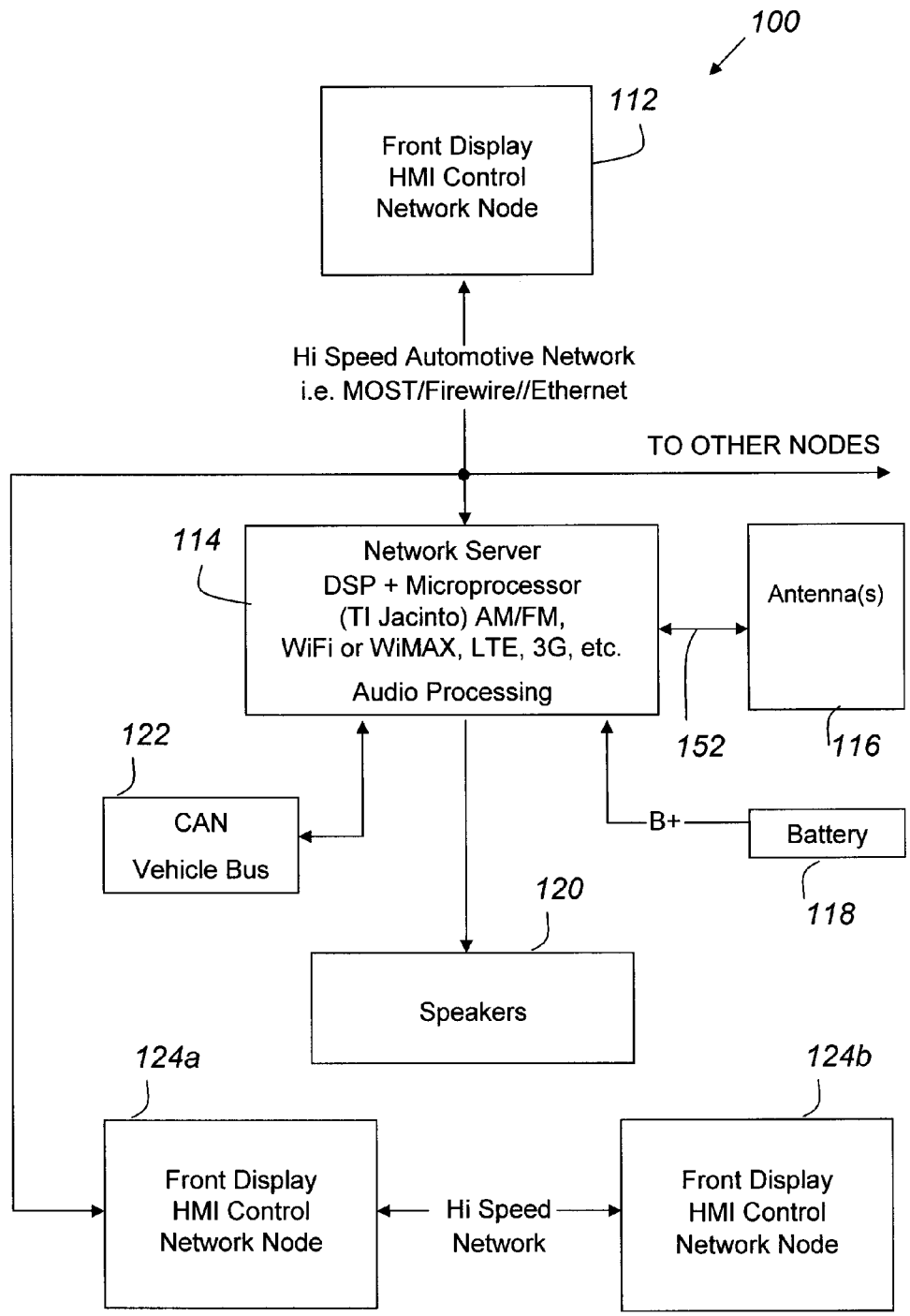
FIG. 1 is a block diagram of one embodiment of an automotive server arrangement of the present invention with wireless inputs and a wired network connection.

FIG. 1 is one embodiment of an automotive server arrangement 100 of the invention with wireless inputs and a wired network connection. Arrangement 100 includes a front display 112, a network server 114, antenna(s) 116, a battery 118, speakers 120, a controller-area network (CAN) vehicle bus 122, and rear displays 124a-b. Front display 112 may be included in a head end unit (not shown) disposed in the passenger compartment of the vehicle (e.g., in the dashboard). Network server 114 may be disposed in the trunk of the vehicle. As discussed in greater detail below, network server 114 may include an amplifier for driving speakers 120.

Network server 114 may be connected to front display 112 and to one or both of rear displays 124a-b via a high speed automotive network, such as Media Oriented Systems Transport (MOST), Firewire, or Ethernet, for example. Rear displays 124a-b may be connected to each other via the same high speed automotive network.

Figure 2:
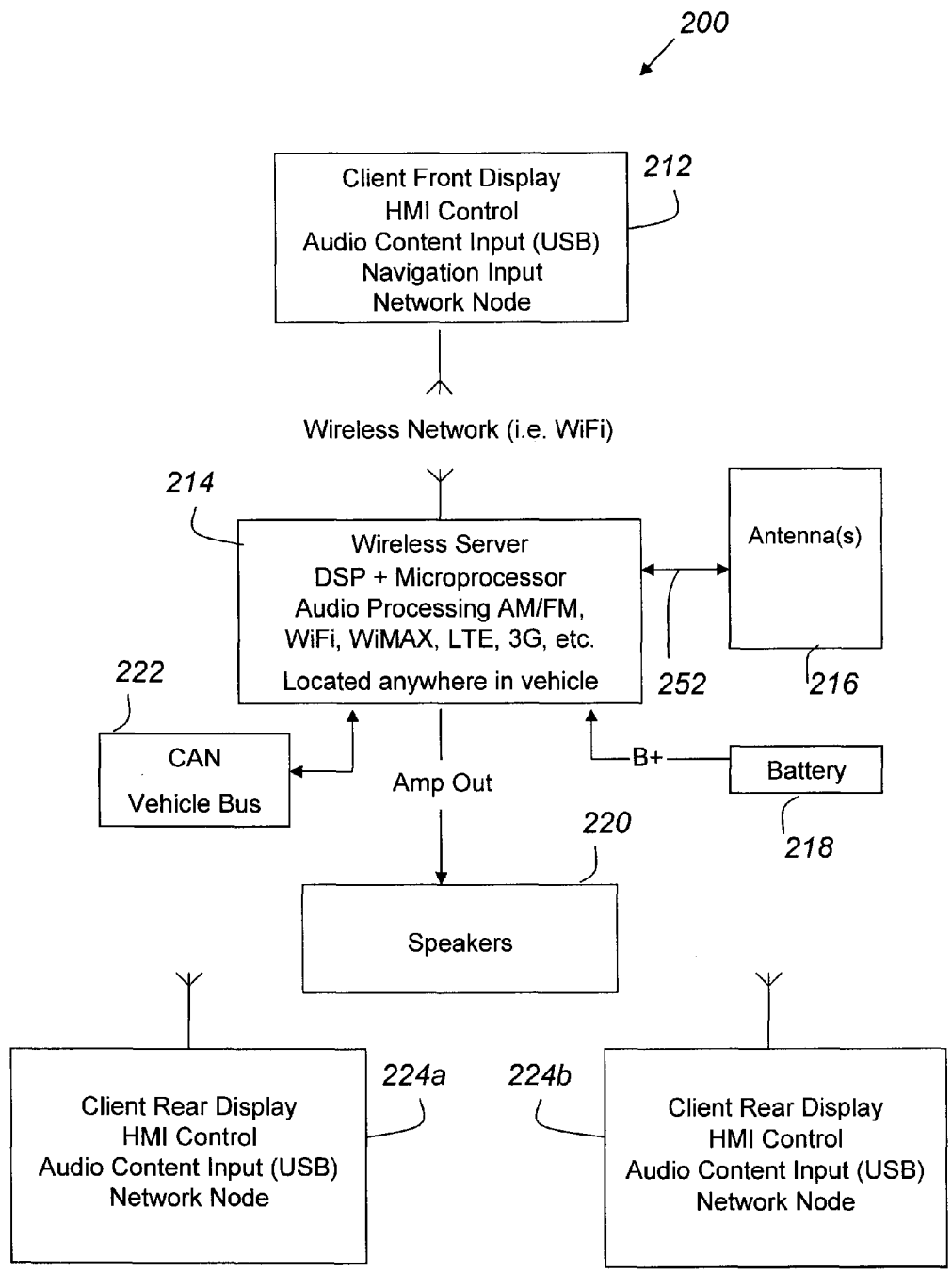
FIG. 2 is a block diagram of another embodiment of an automotive server arrangement of the present invention with wireless inputs and a wireless network connection.

FIG. 2 is another embodiment of an automotive server arrangement 200 of the invention with wireless inputs and a wireless network connection. Arrangement 200 includes a front display 212, a network server 214, antenna(s) 216, a battery 218, speakers 220, a controller-area network (CAN) vehicle bus 222, and rear displays 224a-b. Front display 212 may be included in a head end unit (not shown) disposed in the passenger compartment of the vehicle (e.g., in the dashboard). Network server 214 may be disposed in the trunk of the vehicle, although it is possible for server 214 to be disposed anywhere in the vehicle. As discussed in greater detail below, network server 214 may include an amplifier for driving speakers 220.

Network server 214 may be connected to front display 212 and to rear displays 224a-b via a wireless network, such as WiFi, for example. Rear displays 224a-b may be connected to each other via the same wireless network.

Figure 3:
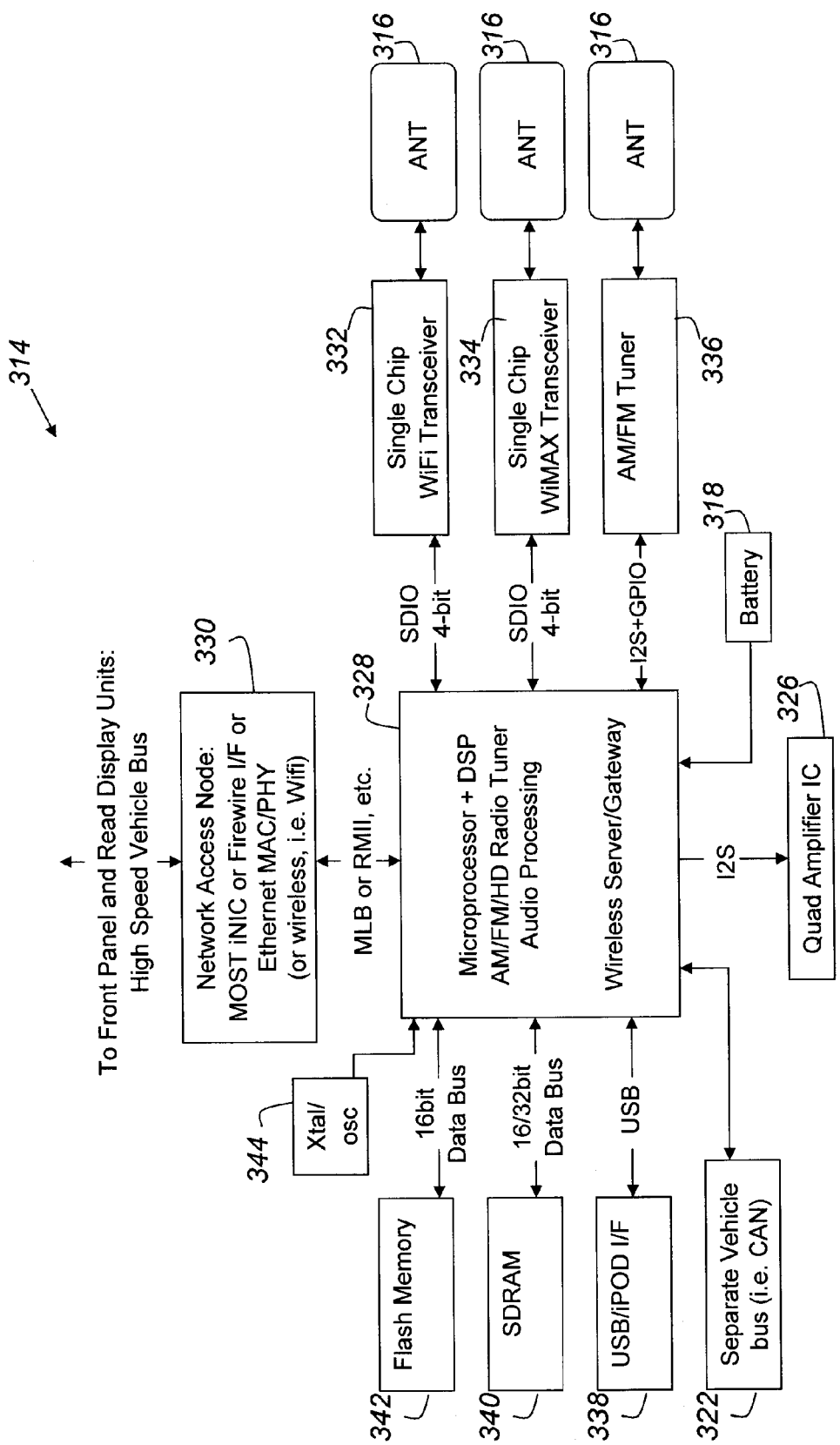
FIG. 3 is a block diagram of one embodiment of a networked automotive server of the of the present invention, suitable for use in either of the arrangements of FIGS. 1 and 2.

A remote amplifier (also known as a trunk mounted amplifier) normally serves a simple purpose of amplifying and driving multiple speakers in a vehicle. As shown in FIG. 3, a networked automotive server 314 may include a quad amplifier IC 326 for driving speakers.

Network server 314 may include a digital signal processor (DSP) 328, which may be used to implement several functions to enhance the stereo (or multiple channel) audio signal coming from a radio tuner, CD, DVD, satellite, or iPOD audio source. The DSP may also be used to drive multiple speakers to create an optimized surround sound experience. The DSP may implement a fixed or programmable equalization (EQ), mixing, limiting the volume levels as required, and compression to avoid distortion.

Most existing remote amplifiers use an analog connection for a uni-directional audio transmission path from the head unit to the remote amplifier due to the higher cost of digital networking interfaces. However, a digital path from the head unit to the remote amplifier may provide better performance because a digital connection is not susceptible to external environmental noise or distortion. Such a digital path may be in the form of a network access node 330 implementing a MOST, Firewire, Ethernet-AVB (Audio Video Bridging) or Sony/Philips Digital Interface (S/PDIF) digital connection, for example. DSP 328 may allow for floating point signal processing, and may be capable of running TCP/IP stacks. In order to run TCP/IP stacks, DSP 328 may have a processor speed of over 400 million instructions per second (MIPS).

Due to the high level of microprocessor performance and the high speed network between the head unit and the remote amplifier, the remote amplifier may include a wireless receiver that includes WiFi, WiMAX, LTE, 3G (HSDPA) or other wireless data receiver technology. An advantage of having the wireless receiver in the trunk of the vehicle rather than more toward the front of the vehicle is that the wiring from the receiver to a trunk mounted antenna may be more convenient to install and access, as well as shorter and less expensive. According to the invention, the remote amplifier may be incorporated in an automotive network server with wireless receivers. A 'thin client" front display and rear displays provide for interfacing and control by the user.

In the embodiment of FIG. 3, DSP 328 is coupled to three antennas 316 via a WiFi transceiver 332, a WiMAX transceiver 334, and an AM/FM tuner 336, respectively. DSP 328 may be in communication with transceivers 332, 334 via respective four-bit Secure Digital Input/Output (SDIO) interface. DSP 328 may be in communication with AM/FM tuner 336 via a bus operating on the Integrated Interchip Sound (I2S) electrical serial bus interface standard along with a General Purpose Input/Output (GPIO) interface. DSP 328 may also be in communication with quad amplifier IC 326 via a bus operating on the I2S electrical serial bus interface standard.

DSP 328 may be in communication with an iPOD 338 or other USB-compatible device via a bus operating on the Universal Serial Bus (USB) specification. DSP 328 may be in communication with synchronous dynamic random access memory (SDRAM) 340 via a 16- or 32-bit data bus, and may be in communication with flash memory 342 via a 16-bit data bus. A crystal oscillator 344 may provide a stable clock signal and/or stabilize frequencies for the radio receiver(s).

DSP 328 may be in communication with network access node 330 via a Middleware Logical Bus (MLB) or Reduced Media Independent Interface (RMII) Application Programming Interface (API). Network access node 330, in turn, may be connected to the head unit, the front display and/or the rear displays via a high speed vehicle bus.

Figure 4:
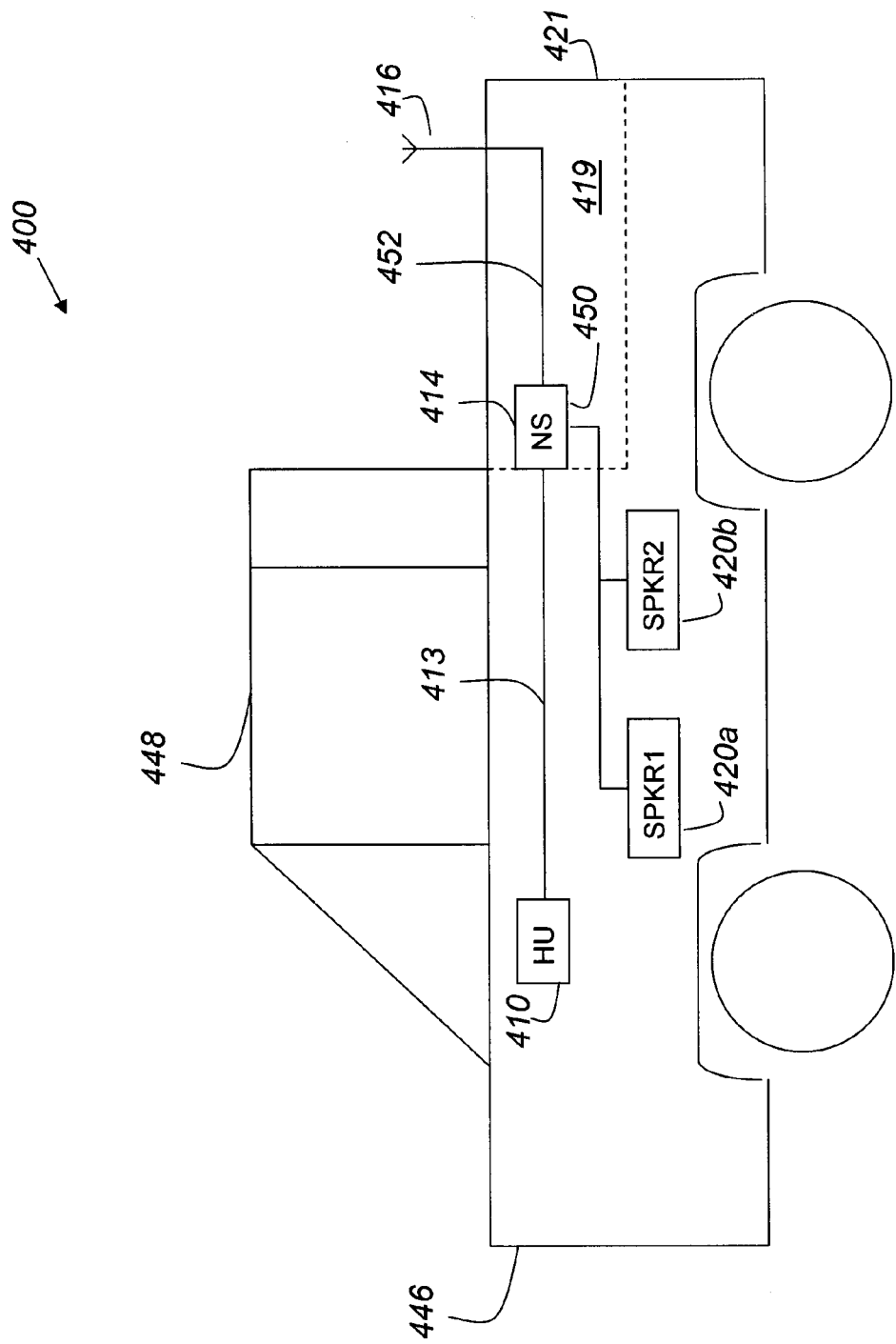
FIG. 4 is a schematic diagram of a vehicle including an automotive server arrangement of the invention.

Illustrated in FIG. 4 is one embodiment of a vehicle including an automotive server arrangement 400 of the invention. Arrangement 400 includes a network server 414 in communication with a head end unit 410 via a high speed, bi-directional automotive network 413, such as Media Oriented Systems Transport (MOST), Firewire, or Ethernet, for example. Head end unit 410 may be disposed in a passenger compartment of the vehicle, and, in one embodiment, head end unit 410 is installed in the dashboard of the vehicle.

In the embodiment shown in FIG. 4, network server 414 is disposed in a trunk 419 (indicated by dashed lines) of the vehicle, and antenna 416 is disposed at a rear end 421 of the vehicle, rearward of network server 414.

More generally, network server 414 may be disposed in relatively close proximity to antenna 416 (e.g., network server 414 may be disposed within four feet of antenna 416) such that the wired connection between network server 414 and antenna 416 is relatively short (e.g., four feet long or less) with all of the above-described advantages of higher signal quality and lower cost. In one embodiment, network server 414 is disposed in-between head end unit 410 and antenna 416, thereby minimizing the total length of required wiring.

In the case of multiple antennas, the network server may be disposed at a location that substantially minimizes the total length of wiring required to connect the network server with each of the antennas, and possibly to the head unit. More generally, the network server may be disposed within the largest circle that can be defined by the network server and any two of the antennas, with the network server and each of the antennas being modeled for this purpose as being in a same horizontal plane.

Even if the antenna(s) is/are placed in different locations on the vehicle, the network server may still be disposed in-between the head end unit and the antenna(s), and the network server may still be disposed outside of the dashboard. For example, if the antenna is disposed at front end 446 of the vehicle, then network server 414 may be disposed forward of head end unit 410, in-between head end unit 410 and the antenna. As another example, if the antenna is disposed on the outside of roof 448 of the vehicle, then network server 414 may be disposed above head end unit 410 on the inside of roof 448, in-between head end unit 410 and the antenna.

Network server 414 includes a processor (not shown) for processing the audio signals that the processor receives from antenna 416. In one embodiment, antenna 416 receives and transmits wireless signals from and to the internet. The processor within network server 414 may operate at a speed of greater than 400 MIPS such that the processor is able to run TCP/IP stacks and bi-directionally communicate via the internet.

Network server 414 also includes an amplifier (not shown) for driving audio speakers 420a-b. All of the components of network server 414 may be disposed within a common housing 450. In particular, the processor and the amplifier of network server 414 may be disposed in a same housing 450.

Figure 5:
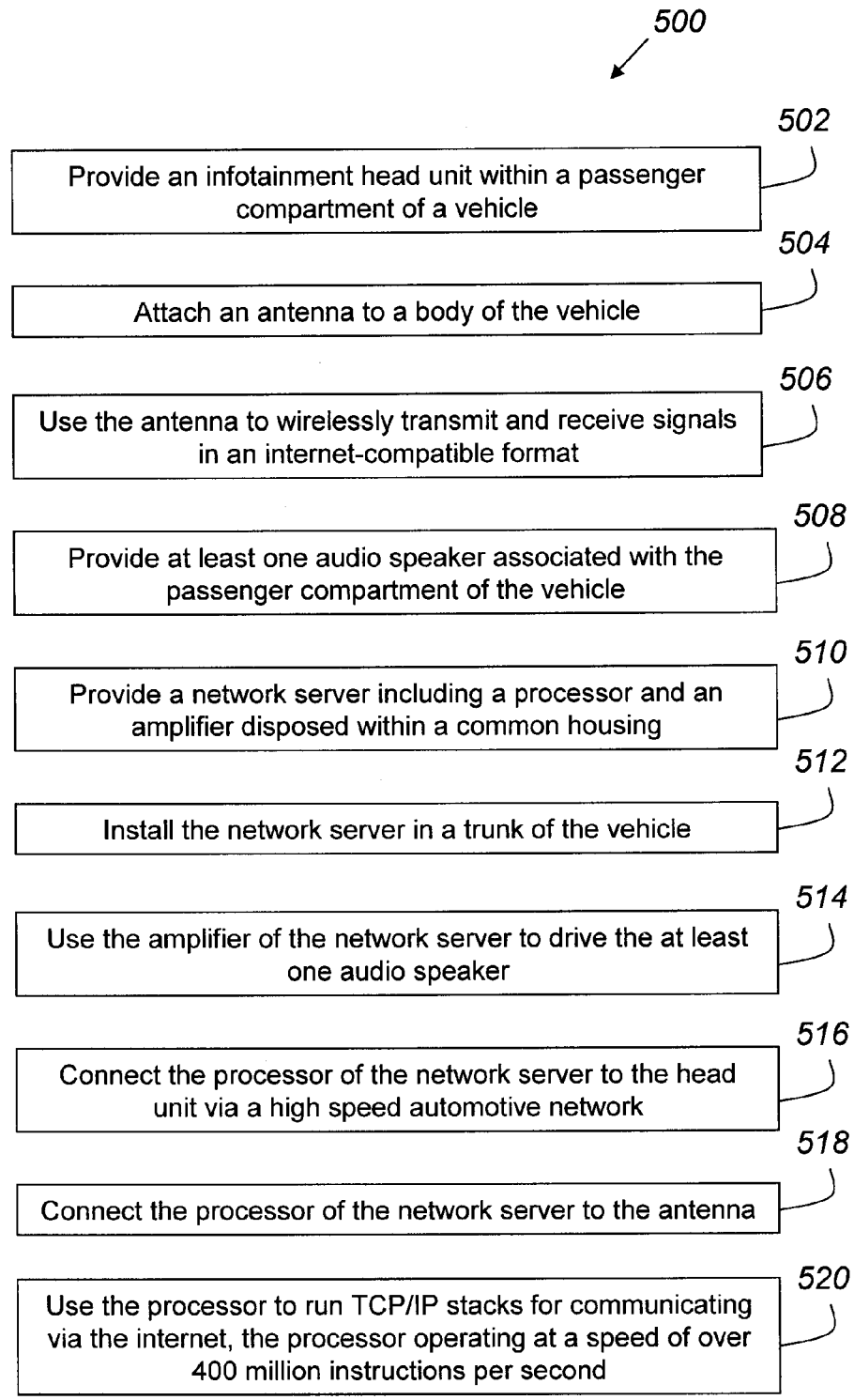
FIG. 5 is a flow chart of a method of providing infotainment within a vehicle, in accordance with an exemplary embodiment of the present invention.

FIG. 5 is a process flow diagram of a method of providing infotainment within a vehicle, in accordance with an exemplary embodiment of the present invention. The method may be referred to by the reference number 500 and may begin at block 502, wherein an infotainment head unit is provided within a passenger compartment of the vehicle. For example, in the embodiment illustrated in FIG. 4, an infotainment head unit 410 is provided on a dashboard of the vehicle within arms length of the front seat passengers. However, it is also possible for the head unit to be installed in other places within the passenger compartment, such as immediately behind the front seat, within arms length of the rear seat passengers.

At block, 504, an antenna is attached to a body of the vehicle. In some exemplary embodiments, the antenna is disposed in the front windshield of the vehicle, or at some other place on the vehicle where the antenna may get good reception. However, in the embodiment of FIG. 4, antenna 416 is attached at a rear end of the vehicle as shown.

At block 506, the antenna is used to wirelessly transmit and receive signals in an internet-compatible format. In some exemplary embodiments, head unit 410 may exchange information with a web site via the internet. Thus, head unit 410 may create signals for wireless transmission by antenna 416 wherein the signals are in a format that is compatible with the internet. Likewise, the signals received by antenna 416 from internet-based sources may also be compatible with the internet, and head unit 410 may be capable of processing such received signals. For example, head unit 410 may communicate with web sites that provide navigation information such as maps corresponding to the vehicle's current location. That is, head unit 410 may wirelessly transmit the vehicle's current location to the web site, and the web site may respond by sending corresponding maps that are received by antenna 416 in the form of wireless signals.

At block 508, at least one audio speaker is provided in association with the passenger compartment of the vehicle. As shown in FIG. 4, the vehicle includes audio speakers 420a-b. The outputs of speakers 420a-b may be pointed towards the passenger compartment so that the passengers in the compartment can best hear the output of the speakers.

At block 510, a network server is provided including a processor and an amplifier disposed within a common housing. In the embodiment of FIG. 3 for example, network server 314 includes a digital signal processor (DSP) 328 and a quad amplifier IC 326. The processor and amplifier may be placed in a same housing, such as housing 450 (FIG. 4).

At block 512, the network server is installed in a trunk of the vehicle. As shown in the example embodiment of FIG. 4, network server 414 is mounted in a rear trunk 419 of the vehicle. Thus, network server 414 is disposed in-between head unit 410 and antenna 416, and network server 414 is within about four feet of antenna 416. Due to this relatively short wiring between network server 414 and antenna 416, the signals exchanged between network server 414 and antenna 416 are likely to experience only minimal degradation in transit. Moreover, the lengths of wiring to head unit 410, which may be relatively expensive, may be also minimized.

At block, 514, the amplifier of the network server is used to drive at least one audio speaker. That is, quad amplifier IC 326 may amplify audio signals from the head unit and transmit the amplified signals to speakers 420a and 420b so that the amplified audio signals may be played on the speakers. Moreover, microprocessor+DSP 328 may enhance as well as amplify the audio signal sent to the speakers.

At block 516, the processor of the network server is connected to the head unit via a high speed automotive network. In the exemplary embodiment of FIG. 1, the DSP+microprocessor of network server 114 is connected to a front display 112 of a head unit via a high speed automotive network such as MOST, Firewire, or Ethernet-AVB.

At block 518, the processor of the network server is connected to the antenna. As shown in FIG. 4, network server 414 may be connected to antenna 416 via an antenna cable 452. As shown in FIGS. 1 and 2, network servers 114, 214 may also be connected to respective antennas via respective antenna cables 152, 252. As further shown in FIG. 3, a microprocessor+DSP 328 controls (via SDIO Interface) a single chip WiFi transceiver connected to antenna(s) 316; to a single chip WiMAX transceiver controlled via SDIO interface; and/or via an IS2+GPIO and an AM/FM tuner.

At block 520, the processor is used to run TCP/IP stacks for communicating via the interne, wherein the processor operates at a speed of over 400 million instructions per second. Microprocessor+DSP 328, for example, is able to run TCP/IP stacks and operates at a speed of over 400 million instructions per second. More generally, however, a processor within the scope of the invention may need to be able to run TCP/IP stacks and operate at a certain speed only to the extent that such is needed to communicate via the internet. A processor within the scope of the invention may need to have the processing capabilities needed to both enhance the audio for the amplifier and communicate via the internet for other in-vehicle web-based applications.

A trunk-mounted amplifier has been described herein as providing internet connectivity to the head end unit. However, it is to be understand that, within the scope of the invention, any remote module with sufficient processing power and a high-speed network (e.g., MOST, Firewire, Ethernet-AVB) to the head end unit could host the wireless receiver and provide data to/from the head end unit for the wireless internet connection. Sufficient processing power for responsive internet connection may be provided, for example, by a CPU with a speed of greater than 400 MIPS.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An automotive server arrangement, comprising:
    an audio head unit disposed in a passenger compartment of a vehicle;
    an antenna associated with the vehicle;
    at least one audio speaker associated with the passenger compartment of the vehicle; and
    a network server disposed in-between the audio head unit and the antenna, the network server including a processor and an amplifier, the processor and the amplifier being disposed within a common housing, the amplifier being configured to drive the at least one audio speaker, the processor being connected to the audio head unit and to the antenna.

2. The automotive server arrangement of claim 1, wherein the antenna is configured to wirelessly transmit and receive signals in an internet-compatible format.

3. The automotive server arrangement of claim 1, wherein the processor is connected to the audio head unit via a high speed automotive network.

4. The automotive server arrangement of claim 1, wherein the processor is configured to run TCP/IP stacks for communicating via an internet.

5. The automotive server arrangement of claim 1, wherein the processor has an operational speed of over 400 million instructions per second.

6. The automotive server arrangement of claim 1, wherein the antenna is attached to a body of the vehicle.

7. The automotive server arrangement of claim 1, wherein the processor is configured to enhance an audio signal used by the amplifier to drive the at least one audio speaker.

8. The automotive server arrangement of claim 1, wherein the network server is disposed at a location that substantially minimizes a total length of wiring required to connect the network server to the antenna and to the audio head unit.

9. An automotive server arrangement, comprising:
    an infotainment head unit disposed in a passenger compartment of a vehicle;
    an antenna attached to a body of the vehicle and configured to wirelessly transmit and receive signals in an internet-compatible format;
    at least one audio speaker associated with the passenger compartment of the vehicle; and
    a network server disposed in a trunk of the vehicle and including a processor and an amplifier, the processor and the amplifier being disposed within a common housing, the amplifier being configured to drive the at least one audio speaker, the processor being connected to the infotainment head unit via a high speed automotive network, the processor being connected to the antenna and being configured to run TCP/IP stacks for communicating via an internet, the processor having an operational speed of over 400 million instructions per second.

10. The automotive server arrangement of claim 9, wherein the processor is configured to enhance an audio signal used by the amplifier to drive the at least one audio speaker.

11. The automotive server arrangement of claim 9, wherein the network server is disposed in-between the infotainment head unit and the antenna.

12. The automotive server arrangement of claim 9, wherein the processor is connected to the antenna via an AM/FM tuner.

13. The automotive server arrangement of claim 9, wherein the network server is disposed at a location that minimizes a total length of wiring required to connect the network server to the antenna.

14. A method of providing infotainment within a vehicle, comprising the steps of:
    providing an infotainment head unit within a passenger compartment of the vehicle;
    attaching an antenna to a body of the vehicle;
    wirelessly transmitting and receiving signals in an internet-compatible format, the transmitting and receiving being performed by the antenna;
    providing at least one audio speaker associated with the passenger compartment of the vehicle;
    providing a network server including a processor and an amplifier, the processor and the amplifier being disposed within a common housing;
    installing the network server in a trunk of the vehicle;
    driving the at least one audio speaker, the driving being performed by the amplifier of the network server;
    connecting the processor of the network server to the infotainment head unit via a high speed automotive network;
    connecting the processor of the network server to the antenna; and
    running TCP/IP stacks for communicating via an internet, the running being performed by the processor, the processor operating at a speed of over 400 million instructions per second.

15. The method of claim 14, further comprising:
    using an audio signal to drive the at least one audio speaker with the amplifier of the network server; and
    using the processor to enhance the audio signal used by the amplifier to drive the at least one audio speaker.

16. The method of claim 14, wherein the processor is connected to the antenna via an AM/FM tuner.

17. The method of claim 14, further comprising installing the network server in-between the infotainment head unit and the antenna.

18. The method of claim 14, wherein the antenna is used to wirelessly exchange signals with an internet-based source of navigation information.

19. The method of claim 14, wherein the network server is installed within four feet of the antenna.

20. The method of claim 14, wherein the attaching step comprises attaching a plurality of antennas to the body of the vehicle, the installing step comprises installing the network server at a location that minimizes a total length of wiring required to connect the network server with each of the plurality of the antennas.

* * * * *